(12) United States Patent
Tsirkin et al.

(10) Patent No.: US 8,725,948 B2
(45) Date of Patent: May 13, 2014

(54) OPCODE LENGTH CACHING

(75) Inventors: Michael Tsirkin, Yokneam (IL); Uri Lublin, Raanana (IL)

(73) Assignee: Red Hat Israel, Ltd., Raanana (IL)

(*) Notice: Subject to any disclaimer, the term of this patent is extended or adjusted under 35 U.S.C. 154(b) by 863 days.

(21) Appl. No.: 12/899,065

(22) Filed: Oct. 6, 2010

(65) Prior Publication Data

US 2012/0089783 A1    Apr. 12, 2012

(51) Int. Cl.
  *G06F 12/00*   (2006.01)
  *G06F 13/00*   (2006.01)
  *G06F 13/28*   (2006.01)
  *G06F 12/08*   (2006.01)
  *G06F 9/38*    (2006.01)

(52) U.S. Cl.
  CPC .......... *G06F 12/0875* (2013.01); *G06F 9/3802* (2013.01)
  USPC ......................................................... 711/125

(58) Field of Classification Search
  USPC ......................................................... 711/125
  See application file for complete search history.

(56) References Cited

U.S. PATENT DOCUMENTS

| | | | | |
|---|---|---|---|---|
| 5,301,289 A * | 4/1994 | Suzuki et al. | ................ | 711/213 |
| 5,715,420 A * | 2/1998 | Kahle et al. | ................ | 711/206 |
| 6,125,441 A * | 9/2000 | Green | ................ | 712/210 |
| 7,426,612 B2 * | 9/2008 | Rudd | ................ | 711/141 |
| 2009/0044274 A1 * | 2/2009 | Budko et al. | ................ | 726/24 |

OTHER PUBLICATIONS

Intel®, Intel® 64 and IA-32 Architectures Software Developer's Manual, vol. 2A, Chapter 2 Instruction Format, pp. 2-1-2-15, Jun. 2010.

* cited by examiner

*Primary Examiner* — Matthew Bradley
*Assistant Examiner* — Craig Goldschmidt
(74) *Attorney, Agent, or Firm* — Lowenstein Sandler LLP

(57) ABSTRACT

A computer system caches variable-length instructions in a data structure. The computer system locates a first copy of an instruction in the cached data structure using a current value of the instruction pointer as a key. The computer system determines a predictive length of the instruction, and reads a portion of the instruction from an instruction memory as a second copy. The second copy has the predictive length. Based on the comparison of the first copy with the second copy, the computer system determines whether or not to read the rest of the instruction from the instruction memory, and then interprets the instruction for use by the computer system.

20 Claims, 7 Drawing Sheets

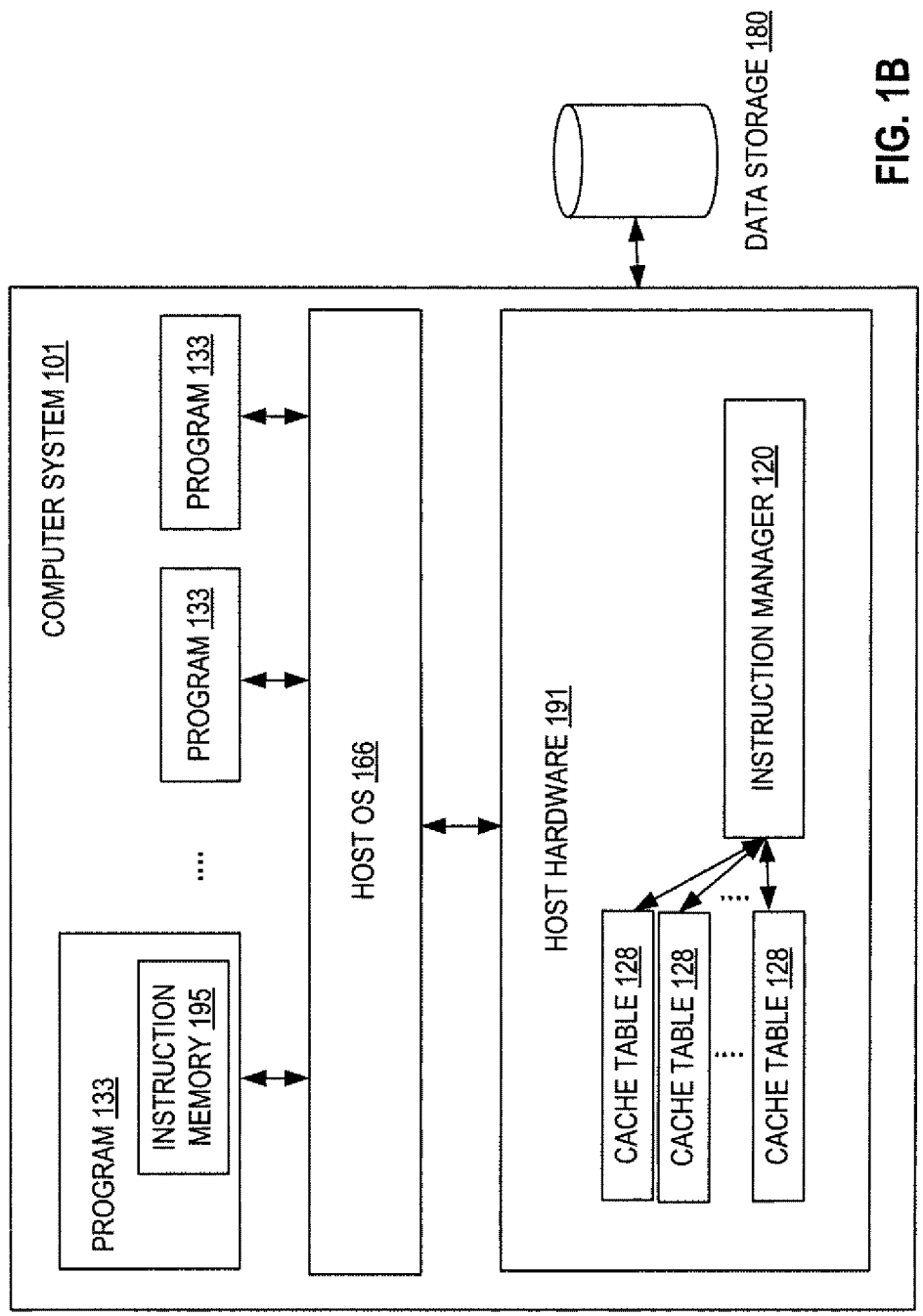

OPCODE LENGTH CACHING

TECHNICAL FIELD

Embodiments of the present invention relate to a computer system, and more specifically, to a computer system that executes variable-length instructions.

BACKGROUND

Variable-length instruction formats are widely used by many existing computer systems. Variable-length instruction formats generally provide higher instruction density and smaller code size than fixed-length instruction formats.

A variable-length instruction can be interpreted or decoded in two parts. First, the prefix of the instruction is read and interpreted to determine the instruction length. Prefix reading can be a multi-staged operation. Secondly, the rest of the instruction is read. As the second part of the operation is conditional upon the value of the prefix, the execution of the instructions cannot be easily pipelined. Such performance degradation in pipelining can be seen in both virtualized systems and non-virtualized systems.

BRIEF DESCRIPTION OF THE DRAWINGS

The present invention is illustrated by way of example, and not by way of limitation, and can be more fully understood with reference to the following detailed description when considered in connection with the figures in which:

FIG. 1B is a block diagram illustrating one embodiment of a non-virtualized computer system.

DETAILED DESCRIPTION

Described herein is a method and system for caching variable-length instructions ("opcode") in a data structure. In one embodiment, a computer system locates a first copy of an instruction in the cached data structure using a current value of the instruction pointer as a key. The computer system determines a predictive length of the instruction, and reads a portion of the instruction from an instruction memory as a second copy. The second copy has the predictive length. Based on the comparison of the first copy with the second copy, the computer system determines whether or not to read the rest of the instruction from the instruction memory, and then interprets the instruction for use by the computer system.

In one embodiment, the computer system may cache the length of an instruction together with the instruction in a cache table. The cached instruction length may be coded in the form of a prefix of the cached instruction, or in an uncoded form. Thus, the predictive length can be determined based on the prefix of the cached instruction (coded form), or can be the length of the instruction that was fetched, interpreted and cached previously (uncoded form). Alternatively, the computer system may use a fixed length for all of the instructions loaded in an instruction memory. In this embodiment, the predictive length can be the fixed length. By caching an instruction and its length (or using a fixed length), the computer system may reuse the instructions in the cache if the same instructions are executed more than once. Thus, the computer system may avoid reading at least some of the instructions in two parts (e.g., reading the prefix first, and then reading the rest of the instruction) from the instruction memory. As the second read operation is conditional upon the first read operation, avoiding the conditional read can improve pipelining and increase system performance.

In one embodiment, the computer system may provide a virtualized environment by hosting one or more virtual machines. A cached data structure may be designated to cache instructions from a memory of a guest that runs on one of the virtual machines. Alternatively, the computer system may be a non-virtualized computing system that does not support virtual machines.

In the following description, numerous details are set forth. It will be apparent to one skilled in the art, however, that the present invention may be practiced without these specific details. In some instances, well-known structures and devices are shown in block diagram form, rather than in detail, in order to avoid obscuring the present invention.

Figure 1A:
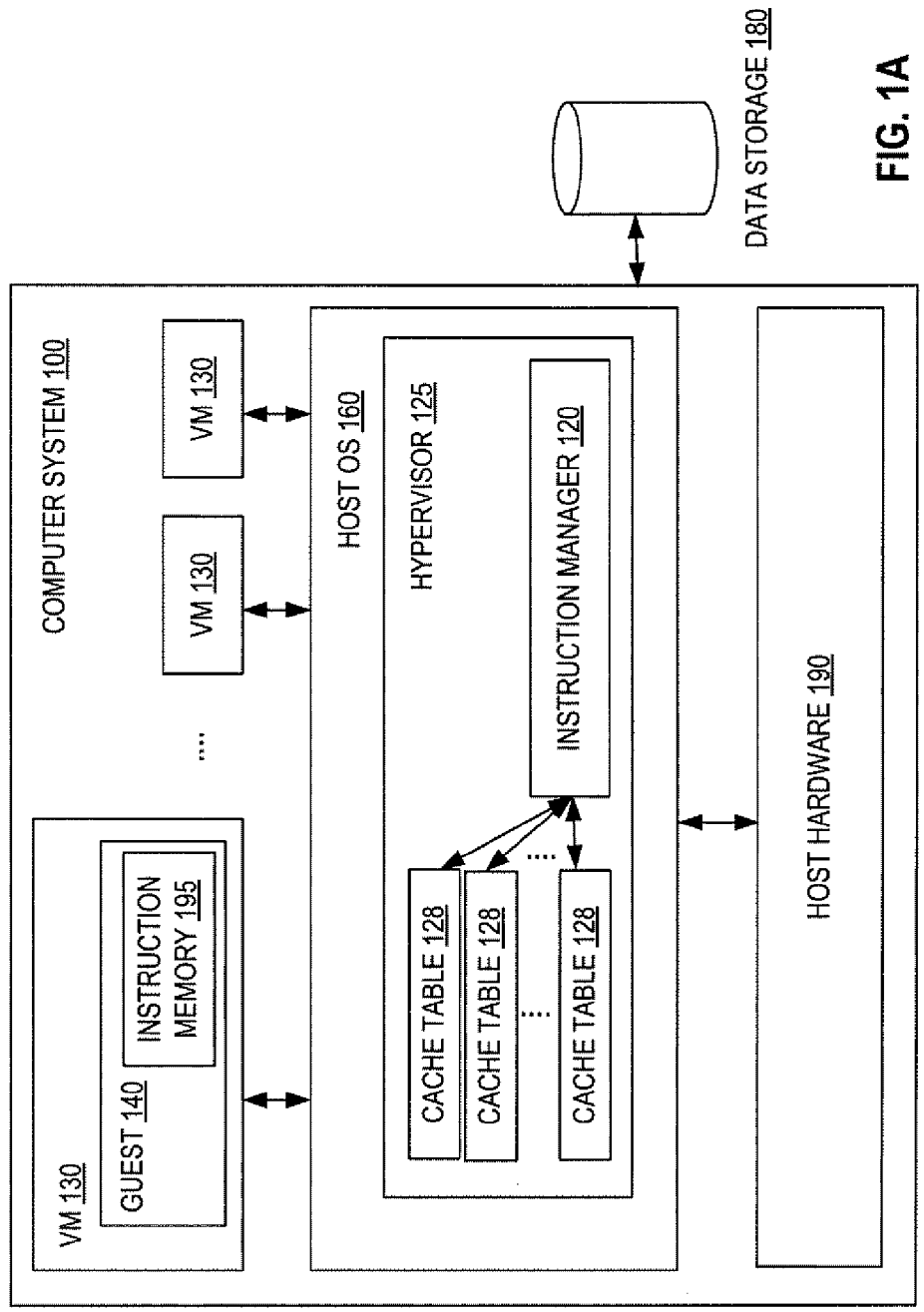
FIG. 1A is a block diagram illustrating one embodiment of a virtualized computer system that hosts virtual machines.

FIG. 1A is a block diagram that illustrates an embodiment of a computer system 100 that hosts a plurality of virtual machines (VM) 130. Each virtual machine 130 runs a guest 140, which in turn runs a number of programs. Some of the programs are privileged system programs that form at least part of a guest operating system (OS) (not shown). The virtual machines 130 may have the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

The computer system 100 also runs a host OS 160 to manage system resources. In one embodiment, the computer system 100 runs a hypervisor 125 to virtualize underlying host hardware 190, making the use of the virtual machine 130 transparent to the guest 140. The hypervisor 125 may also be known as a virtual machine monitor (VMM) or a kernel-based hypervisor. In some embodiments, the hypervisor 125 may be part of the host OS 160. Each program in the guest, as well as the guest OS, loads its instructions for execution into the guest instruction memory.

The computer system 100 also includes one or more physical central processing units (CPUs), memory, I/O devices and other hardware components. The computer system 100 may also be coupled to a data storage 180, which may include mass storage devices, such as magnetic or optical storage based disks, tapes or hard drives.

According to one embodiment of the present invention, the computer system 100 caches a data structure in the hypervisor 125 (e.g., a cache table 128) for each program that runs on the virtual machines 130. The cache table 128 can be read and updated by an instruction manager 120.

In one embodiment, the cache table 128 is indexed by an instruction pointer (IP). The instruction pointer contains the address of an instruction that has been loaded into an instruction memory 195 in the guest 140 and is waiting for execution. In one embodiment, the instruction pointer is used by the CPU to pass the current instruction to be executed to the instruction manager 120. The content of the instruction pointer is the address value of the instruction to be decoded or interpreted by the instruction manager 120. In some computer systems, the instruction pointer is also known as a program counter or an enhanced instruction pointer (EIP). In the following discussion, the terms "instruction pointer," "program counter" and "EIP" are used interchangeably.

FIG. 1B illustrates an alternative embodiment of a computer system 101. In this alternative embodiment, the computer system 101 is a non-virtualized computing system. That is, the computer system 101 does not host any virtual machines and does not include a hypervisor. The computer system 101 runs a host OS 166 that manages the execution of one or more programs 133 at the same time. The computer system 101 includes host hardware 191, which further includes the instruction manager 120 and one or more cache tables 128. Each cache table 128 is designated to one of the programs 133. In some embodiments, the instruction manager 120 in a non-virtualized computing system performs the function of an instruction decoder. The operations for using and updating the cache tables 128 in the computer system 101 are the same as those in the computer system 100.

In both of the embodiments shown in FIG. 1A and FIG. 1B, instructions to be executed have been loaded into the instruction memory 195. Each of the instructions is defined according to a variable-length instruction set format. During the execution of a program, the instructions in the program may modify its own instructions in the instruction memory 195. Therefore, the content of the cache table 128 needs to be updated from time to time.

Figure 2:
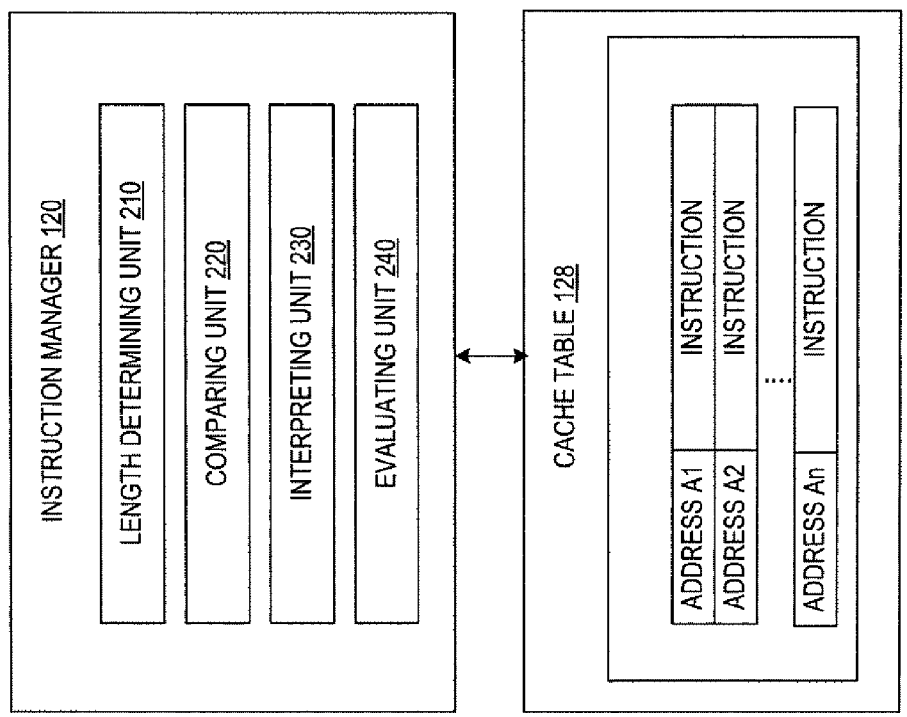
FIG. 2 is a block diagram illustrating one embodiment of an instruction manager and a cache table.

FIG. 2 illustrates an embodiment of the instruction manager 120 in the computer system 100 of FIG. 1A or the computer system 101 of FIG. 1B. In one embodiment, the instruction manager 120 includes a length determining unit 210 to determine the length of an instruction. In one embodiment, the length determining unit 210 reads a cached instruction length (which is uncoded) directly from the cache table 128 for a given program. In another embodiment, the length determining unit 210 reads a predetermined first portion (e.g., the first byte) of an instruction, also known as the prefix of the instruction. Prefix reading may be a single-staged or multi-staged operation, and may involve table lookups. From the value of the prefix, the length determining unit 210 can determine the type of the instruction and the corresponding length of the instruction. The instruction manager 120 also includes a comparing unit 220 to compare two copies of an instruction and to determine whether the two copies are the same (that is, a match exists). The instruction manager 120 first reads a first copy of the instruction from the cache table 128 for a given program using the instruction pointer for that program as the key (or equivalently, using the instruction pointer and the program ID as the key). The instruction manager 120 then reads a second copy of the instruction (with a predictive length) from the instruction memory 195. If the two copies match, it means that the predictive length is the correct length of the instruction. As a result, the instruction manager 120 does not need to perform an additional read from the instruction memory 195 for the rest of the instruction. If the two copies do not match, the instruction manager 120 may need to perform a second read from the instruction memory 195 to obtain the rest of the instruction. After the instruction is read in its entirety, an interpreting unit 230 of the instruction manager 120 interprets or decodes the instruction for execution.

In some embodiments, the predictive length of an instruction may be cached in the cache table 128 in an uncoded form or a coded form (e.g., in the form of a prefix). In these embodiments, the cache table 128 stores the instruction and its predictive length in the same table entry, which is indexed by the instruction pointer that contains the address of the instruction (or "points to the instruction"). That is, the entire instruction, including the predictive length, is cached in the cache table 128 as one entry. The predictive length can be determined by the length determining unit 210. In an alternative embodiment, the predictive length of an instruction is a pre-determined fixed length for all of the instructions in the instruction memory 195. In this alternative embodiment, it is not necessary to cache the predictive length of an instruction.

In one embodiment, the instructions manager 120 also includes an evaluating unit 240 to evaluate whether to use a cache table for a given program. The evaluation may be based on the privilege level of the program; e.g., an OS program has a higher privilege level than user programs. For example, the evaluating unit 240 may determine to use cache tables for only OS programs and other programs with high privilege levels. Alternatively or additionally, the evaluation may be based on whether the program is enabled for caching. For example, a program may be enabled for caching if the program is registered with the hypervisor 125 in a virtualized environment for caching. That is, with the same privilege level, some programs' instructions may be cached and some other programs' instructions may not be cached. In one embodiment of a virtualized environment, the evaluating unit 240 can also take into account the reason and qualifications for a virtual machine (VM) exit from guest to host, such as I/O access, page fault, etc.

Alternatively or additionally, the evaluating unit 240 may evaluate whether to store an instruction in a cache table that is used by a given program. In this embodiment, not all of the instruction are cached. The evaluation may be based on the instruction type, the program to which the instruction belongs, the VM exit reason (e.g., I/O access, etc.) and qualifications (e.g., whether the instruction is a read or write, access length, etc.) in a virtualized environment, or a combination of the above. For example, the evaluating unit 240 may determine to cache an instruction for I/O access to hardware. Caching such operations can reduce hardware latency and improve system performance since hardware is usually accessed from small number of addresses.

Figure 3:
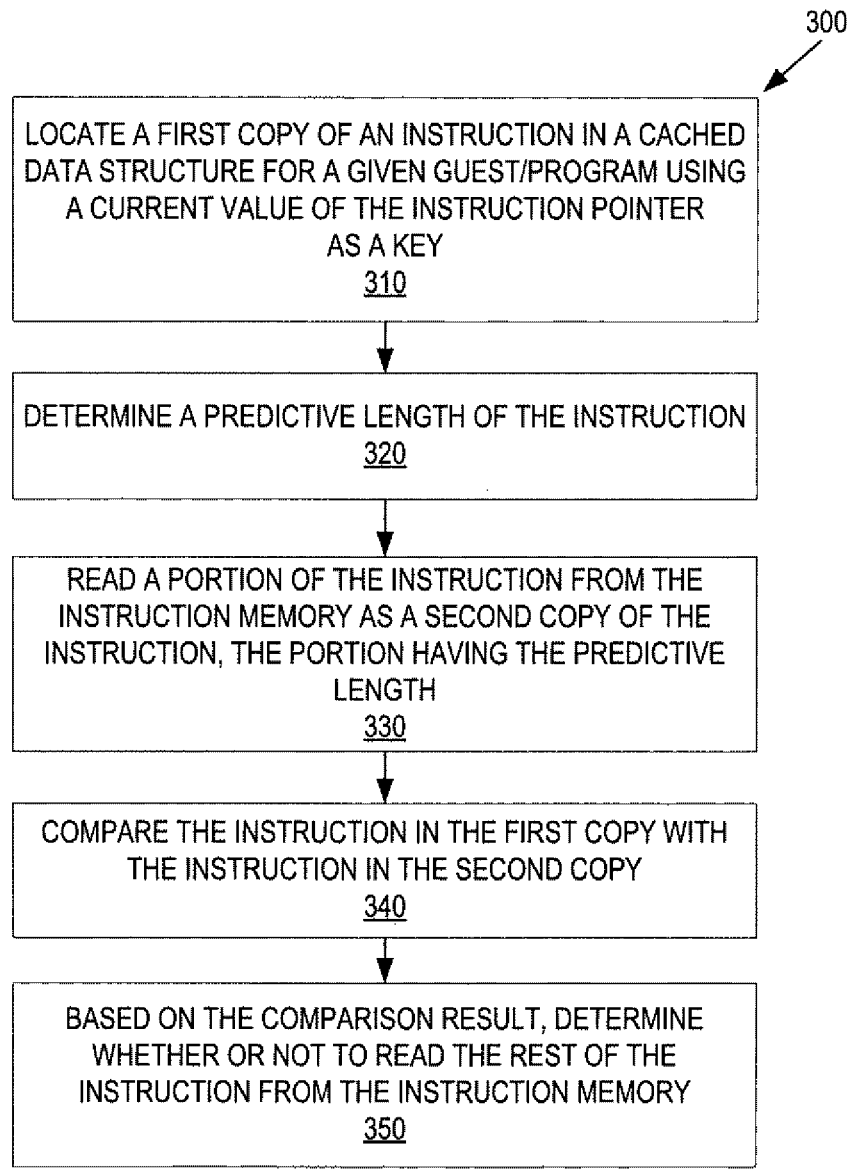
FIG. 3 is a flow diagram illustrating a method for obtaining an instruction using a cached data structure in accordance with one embodiment of the present invention.

FIG. 3 is a flow diagram illustrating one embodiment of a method 300 for obtaining an instruction using the information stored in a cached data structure. The method 300 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 300 is performed by the instruction manager 120 in the hypervisor 125 (FIGS. 1A and 2). In an alternative embodiment, the method 300 is performed by the instruction manager 120 in a non-virtualized computer system (e.g., the computer system 101 of FIG. 1B).

Referring to FIG. 3, in one embodiment, the method 300 begins when the instruction manager 120 is invoked. Typically this happens in response to a change (e.g., an increment or a decrement) to an instruction pointer in a non-virtualized environment, or to a VM exit from guest to host in a virtualized environment. In one embodiment, the instruction manager 120 first determines whether to use a cached data structure (e.g., the cache table 128 of FIG. 2) for the current program based on a privilege level of the program, whether the program is enabled for caching, and/or the VM exit reason and qualifications in a virtualized environment. If the program has a high privilege level (e.g., exceeding a threshold), the program is enabled for caching, and/or the VM exit reason and qualifications is of a relevant type (e.g., guest performing an I/O operation), the instruction manager 120 proceeds to look up an entry in the cached data structure for the program using the current value of the instruction pointer as a key (block 310). The entry, if found in the cached data structure, contains a first copy of the instruction to be interpreted. The instruction manager then determines a predictive length of the instruction (block 320). In one embodiment, the predictive length is the cached instruction length (e.g., in the form of an uncoded length or in the form of the prefix of the instruction). Alternatively, the predictive length may be a predetermined fixed length (e.g., 1, 2 or 3 bytes) used for all of the instructions in the instruction memory 195. Based on the predictive length, the instruction manager 120 reads a portion of the instruction (which is pointed to by the current instruction pointer) from the instruction memory 195 as a second copy of the instruction (block 330). The portion of the instruction has the predictive length. The instruction manager 120 then compares the instruction in the first copy with the instruction in the second copy (block 340). Based on the comparison result, the instruction manager 120 determines whether or not to read the rest of the instruction from the instruction memory 195 (block 350). For example, if the instruction in the first copy is the same as the instruction in the second copy, no further read is performed on this instruction. As another example, if the instructions in the two copies are different and the instruction length determined from the prefix of the second copy is shorter or the same as the predictive length, no further read is performed on this instruction.

Figure 4:
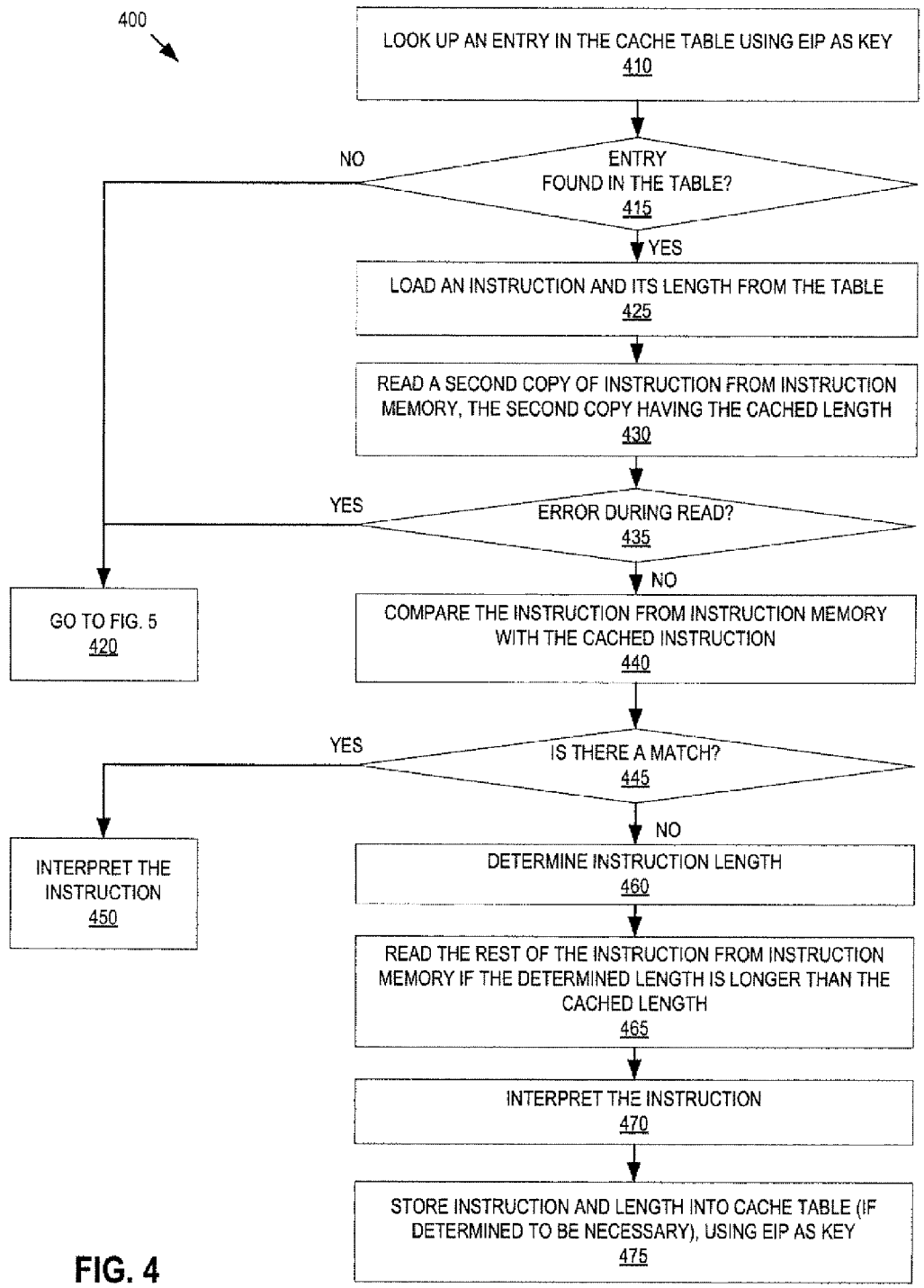
FIG. 4 is a flow diagram illustrating a method for using and updating the cached data structure in accordance with one embodiment of the present invention.

FIG. 4 is a flow diagram illustrating one embodiment of a method 400 for using and updating a cache table. The method 400 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 400 is performed by the instruction manager 120 in the hypervisor 125 (FIGS. 1A and 2). In an alternative embodiment, the method 400 is performed by the instruction manager 120 in a non-virtualized computer system (e.g., the computer system 101 of FIG. 1B). Thus, the term "instruction memory" described below may refer to the instruction memory in a guest or the instruction memory in a host program.

Referring to FIG. 4, in one embodiment, the method 400 begins when the instruction manager 120 looks up an entry in the cache table 128 for the given program by using an instruction pointer (e.g., an EIP) as the key (block 410). If the entry is not found in the table (block 415), the method 400 continues to block 510 of FIG. 5 (block 420). If the entry is found in the cache table (block 415), the instruction manager 120 loads the entry from the table (block 425). The entry is a first copy of the instruction.

As the entry is loaded from the table, the instruction manager 120 reads a second copy of the instruction pointed to by the EIP from the instruction memory 195 (block 430). In one embodiment, the instruction manager 120 reads the instruction from the instruction memory 195 with an instruction length that is also cached in the cache table 128. In an alternative embodiment (which is not shown in FIG. 4) where the length of the instruction is not cached, the instruction manager 120 reads a fixed length of the instruction from the instruction memory 195. Although not explicitly shown in FIG. 4, it is understood that the cached instruction length of FIG. 4 can be replaced by a fixed length in an alternative embodiment.

An error may occur during a read operation. For example, suppose an instruction previously had two bytes that span two pages. Now the instruction has only one byte, and the second page is out of guest segment. When a read is initiated from a user, a segmentation fault occurs and the read operation fails.

Figure 5:
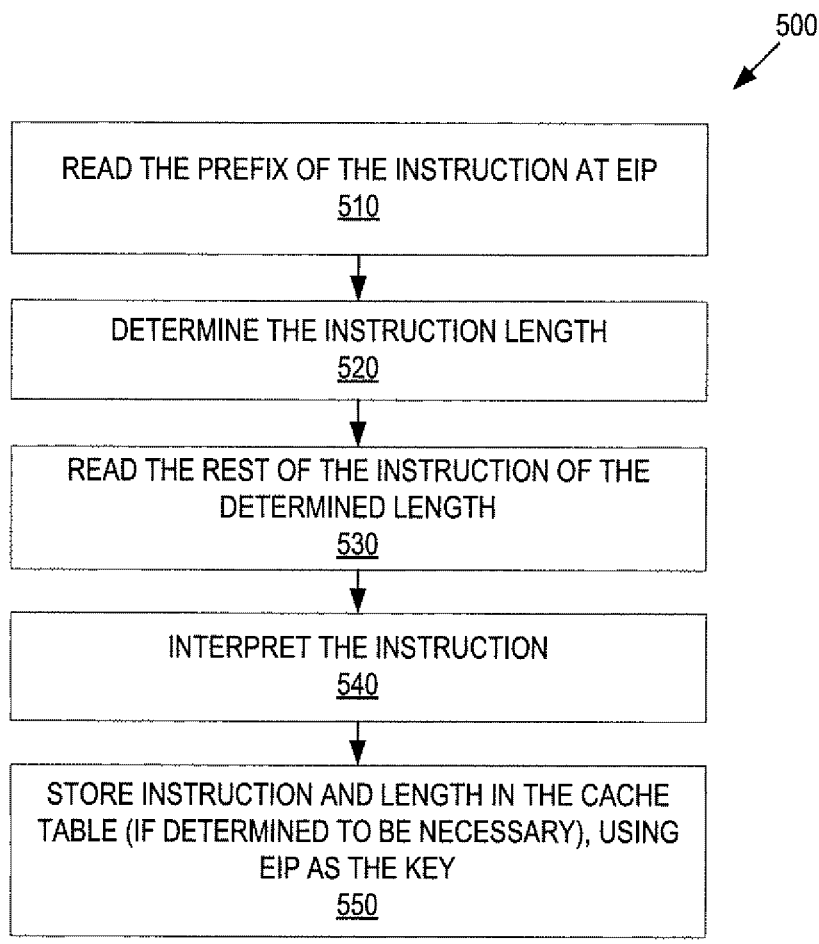
FIG. 5 is a flow diagram illustrating a method that includes further details for updating a cache table in accordance with one embodiment of the present invention.

If an error occurs during the read operation (block 435), the method 400 continues to block 510 of FIG. 5. If there is no error (block 435), the instruction manager 120 compares the instruction in the first copy (from the cache table 128) with the instruction in the second copy (from the instruction memory 195) (block 440). The instruction manager 120 then determines whether there is a match between the two copies (that is, whether the instructions in the two copies are the same) (block 445). If there is a match, which means the cached instruction has the correct length, the instruction manager 120 interprets the instruction (block 450) and moves to the next instruction (block 455). Since the first copy is the same as the second copy of the instruction, the instruction manager 120 may interpret either copy of the instruction. If there is not a match, which means that the cached instruction does not have the correct length, the instruction manger 120 uses the prefix in the second copy to determine the actual length of the instruction (block 460). If the determined length is longer than the predictive length (e.g., the cached instruction length or the fixed length), the instruction manager 120 reads the rest of the instruction from the instruction memory 195 (block 465). If the determined length is shorter than or the same as the predictive length, the instruction manager 120 can easily extract or obtain the instruction from the second copy without performing another read on the instruction. After the current instruction is obtained, the instruction manager 120 interprets the instruction (block 470). The instruction manager 120 may insert the current instruction into the cache table 128 for the program, or delete the existing entry and insert the current instruction, using the EIP as the key (block 475).

In some embodiments, the instruction manager 120 does not necessarily insert the current instruction into the cache table 128 at block 475. Rather, the insertion is optional and is determined based on the instruction type, the privilege level of the program to which the instruction belongs, whether the program is enabled for caching, the VM exit reason and qualifications in a virtualized environment, or a combination of the above.

FIG. 5 is a flow diagram illustrating one embodiment of a method 500 that includes further details for updating the cache table 128. The method 500 may be performed by the computer system 600 of FIG. 6 that may comprise hardware (e.g., circuitry, dedicated logic, programmable logic, microcode, etc.), software (e.g., instructions run on a processing device), or a combination thereof. In one embodiment, the method 500 is performed by the instruction manager 120 (FIGS. 1A and 2). In an alternative embodiment, the method 500 is performed by the instruction manager 120 in a non-virtualized computer system (e.g., the computer system 101 of FIG. 1B). Thus, the term "instruction memory" described below may refer to the instruction memory in a guest or the instruction memory in a host program.

Referring to FIG. 5, in one embodiment, the method 500 begins when the instruction pointed to by the EIP cannot be found in the cache table 128 for the given program (block 415 of FIG. 4), or when an error occurred during the time the instruction manager 120 reads the instruction from the instruction memory 195 (block 435 of FIG. 4). When either of the above conditions occurs as shown in FIG. 4, the instruction manager 120 reads the prefix of the instruction pointed to by the current EIP from the instruction memory 195 (block 510). Based on the prefix, the instruction manager 120 determines the length of the instruction (block 520). The instruction manager 120 then proceeds to read the rest of the instruction based on the determined instruction length (block 530), and interprets the instruction (block 540). If the instruction does not exist in the cache table 128 for the given program at the location indexed by the current EIP, the instruction manager 120 may insert the instruction and its length into the cache table 128 (block 550). If the location of the cache table 128 contains a value that does not match the instruction read from the instruction memory 195, the instruction manager 120 deletes the value, and may insert the instruction and its length read from the instruction memory 195. In an alternative embodiment where a fixed-length is used, the instruction length does not need to be cached.

In some embodiments, the instruction manager 120 does not necessarily insert the current instruction into the cache table 128 at block 550. Rather, the insertion is optional and is determined based on the instruction type, the privilege level of the program to which the instruction belongs, whether the program is enabled for caching, the VM exit reason and qualifications in a virtualized environment, or a combination of the above.

Figure 6:
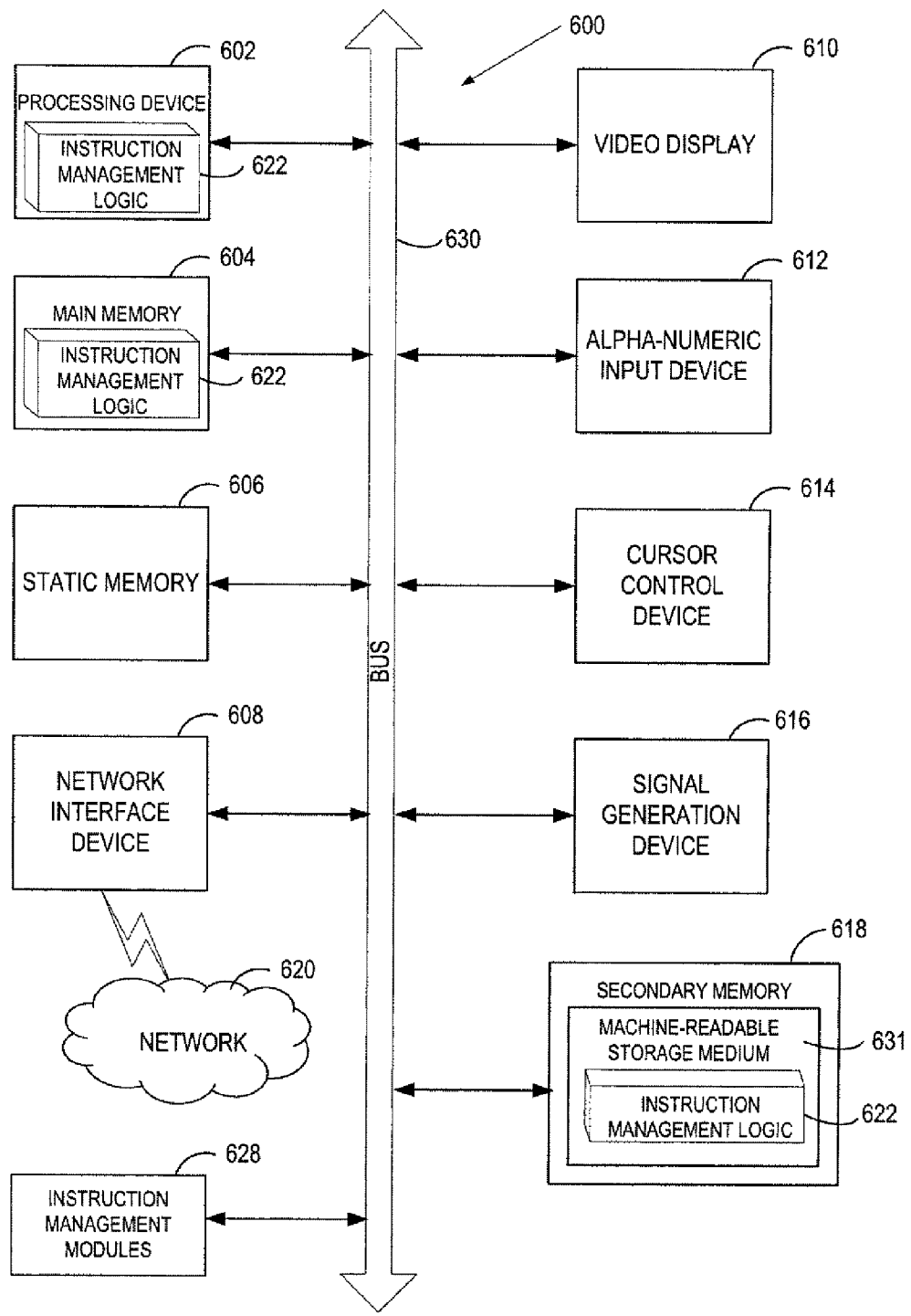
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

The processing device 602 represents one or more general-purpose processing devices such as a microprocessor, central processing unit, or the like. More particularly, the processing device 602 may be a processor implementing a variable-length instruction set. The processing device 602 may also be one or more special-purpose processing devices such as an application specific integrated circuit (ASIC), a field programmable gate array (FPGA), a digital signal processor (DSP), network processor, or the like. The processing device 602 is configured to execute instruction management logic 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or, more specifically, a computer-readable storage medium) 631 on which is stored one or more sets of instructions (e.g., instruction management logic 622) embodying any one or more of the methodologies or functions described herein (e.g., the instruction manager 120 of FIGS. 1A, 1B and 2). The instruction management logic 622 may also reside, completely or at least partially, within the main memory 604 and/or within the processing device 602 during execution thereof by the computer system 600, the main memory 604 and the processing device 602 also constituting machine-readable storage media. The instruction management logic 622 may further be transmitted or received over a network 620 via the network interface device 608.

The machine-readable storage medium 631 may also be used to store the instruction management logic 622 persistently. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 600 may additionally include instruction management modules 628 for implementing the functionalities of the instruction manager 120 of FIGS. 1A, 1B and 2. The module 628, components and other features described herein (for example, in relation to FIGS. 1A and 1B) can be implemented as discrete hardware components or integrated in the functionality of hardware components such as ASICS, FPGAs, DSPs or similar devices. In addition, the module 628 can be implemented as firmware or functional circuitry within hardware devices. Further, the module 628 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "locating", "determining", "reading", "caching", "storing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be deter wined with reference to the appended claims, along with the full scope of equivalents to which such claims are entitled.

What is claimed is:

1. A method comprising:
locating, by a computer system, a portion of a first copy of an instruction in a cached data structure;
determining a predictive length of the first copy of the instruction in the cached data structure;
reading a portion of a second copy of an instruction from an instruction memory in the computer system, the second copy having the predictive length; and
based on a comparison of the portion of the first copy with the portion of the second copy, determining whether to read the rest of the second copy of the instruction.

2. The method of claim 1, wherein the instruction memory is managed by a guest operating system of a virtual machine that is hosted by the computer system.

3. The method of claim 1, wherein the computer system is a non-virtualized computing system.

4. The method of claim 1, further comprising:
caching the instruction from the instruction memory and the predictive length of the instruction from the instruction memory in the cached data structure, wherein the predictive length is cached in a form of a prefix of the instruction from the instruction memory.

5. The method of claim 1, further comprising:
caching the instruction from the instruction memory and the predictive length of the instruction from the instruction memory in the cached data structure.

6. The method of claim 1, wherein the predictive length of the instruction in the cached data structure is a fixed length for all instructions in the cached data structure.

7. The method of claim 1, further comprising:
determining whether an actual length of the instruction from the instruction memory is longer than the predictive length; and
in response to a determination that the actual length is longer, reading the rest of the instruction from the instruction memory.

8. The method of claim 1, further comprising:
determining whether to use the cached data structure based on either a privilege level of a program to which the instruction belongs, whether the program is enabled for caching, or a virtual machine (VM) exit reason and qualifications in a virtualized environment, or a combination of the above.

9. The method of claim 1, further comprising:
in response to a determination that the first copy does not match the second copy, removing the first copy from the cached data structure and evaluating whether to insert the instruction read from the instruction memory into the cached data structure.

10. The method of claim 9, wherein evaluating whether to insert the instruction is based on either an instruction type, a privilege level of a program to which the instruction belongs, whether the program is enabled for caching, or a virtual machine (VM) exit reason and qualifications in a virtualized environment, or a combination of the above.

11. A system comprising:
instruction memory in a computer system to store instructions of a program;
cache memory to store a data structure; and
a computer hardware device coupled to the cache memory and the instruction memory, the computer hardware device to locate a portion of a first copy of an instruction in the data structure, to determine a predictive length of the first copy of the instruction in the data structure, to read a portion of a second copy of an instruction from the instruction memory, the second copy having the predictive length, and to determine whether to read the rest of the second copy of the instruction based on a comparison of the portion of the first copy with the portion of the second copy.

12. The system of claim 11, wherein the cache memory stores the instruction from the instruction memory and the predictive length of the instruction from the instruction memory in the data structure.

13. The system of claim 11, wherein the computer hardware device removes the first copy from the data structure and evaluates whether to insert the instruction read from the instruction memory into the data structure in response to a determination that the first copy does not match the second copy.

14. The system of claim 11, wherein the computer hardware device reads the rest of the instruction from the instruction memory in response to a determination that an actual length of the second copy is longer than the predictive length.

15. The system of claim 11, further comprising:
an evaluating unit to determine whether to use the cached data structure based on either a privilege level of a program to which the instruction belongs, whether the program is enabled for caching, or a virtual machine (VM) exit reason and qualifications in a virtualized environment, or a combination of the above.

16. A non-transitory computer readable storage medium including instructions that, when executed by a processing system, cause the processing system to perform a method comprising:

locating a portion of a first copy of an instruction in a cached data structure;
 determining a predictive length of the first copy of the instruction in the cached data structure;
 reading a portion of a second copy of an instruction from an instruction memory, the second copy having the predictive length; and
 based on a comparison of the portion of the first copy with the portion of the second copy, determining whether to read the rest of the second copy of the instruction.

17. The non-transitory computer readable storage medium of claim 16, wherein the cached data structure caches the instruction from the instruction memory and the predictive length of the instruction from the instruction memory.

18. The non-transitory computer readable storage medium of claim 16, wherein the method further comprises:

determining whether to use the cached data structure based on either a privilege level of a program to which the instruction belongs, whether the program is enabled for caching, or a virtual machine (VM) exit reason and qualifications in a virtualized environment, or a combination of the above.

19. The non-transitory computer readable storage medium of claim 16, wherein the method further comprises:

in response to a determination that the first copy does not match the second copy, removing the first copy from the cached data structure and evaluating whether to insert the instruction read from the instruction memory into the cached data structure.

20. The non-transitory computer readable storage medium of claim 16, wherein the method further comprises:

determining whether an actual length of the instruction from the instruction memory is longer than the predictive length; and
 in response to a determination that the actual length is longer, reading the rest of the instruction from the instruction memory.

* * * * *